(12) United States Patent
Ogura

(10) Patent No.: US 12,293,449 B2
(45) Date of Patent: May 6, 2025

(54) IMAGE PROCESSING DEVICE, IMAGE PROCESSING METHOD, AND PROGRAM

(71) Applicant: Sony Group Corporation, Tokyo (JP)

(72) Inventor: Sho Ogura, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 201 days.

(21) Appl. No.: 18/013,968

(22) PCT Filed: Jul. 2, 2021

(86) PCT No.: PCT/JP2021/025088
§ 371 (c)(1),
(2) Date: Dec. 30, 2022

(87) PCT Pub. No.: WO2022/014369
PCT Pub. Date: Jan. 20, 2022

(65) Prior Publication Data
US 2023/0298260 A1    Sep. 21, 2023

(30) Foreign Application Priority Data
Jul. 17, 2020   (JP) .................................. 2020-123092

(51) Int. Cl.
*G06T 15/20*   (2011.01)
*G06T 7/70*    (2017.01)
*G06T 17/10*   (2006.01)

(52) U.S. Cl.
CPC ................ *G06T 15/20* (2013.01); *G06T 7/70* (2017.01); *G06T 17/10* (2013.01)

(58) Field of Classification Search
CPC ........... G06T 15/20; G06T 7/70; G06T 17/10; H04N 21/2187; H04N 21/23412; H04N 21/23614; H04N 21/4348; H04N 21/6587; H04N 21/816; H04N 21/21805
See application file for complete search history.

(56) References Cited

U.S. PATENT DOCUMENTS

2006/0222079 A1* 10/2006 Park ................... H04N 21/2365
                                                                   375/E7.031
2020/0372691 A1* 11/2020 Ito .......................... H04N 23/90
2021/0092466 A1   3/2021 Suzuki

FOREIGN PATENT DOCUMENTS

| EP | 3432590 A1 | 1/2019 |
| JP | 2001-078231 A | 3/2001 |
| JP | 2015-187797 A | 10/2015 |
| JP | 2019-149122 A | 9/2019 |

(Continued)

*Primary Examiner* — Jeffery A Brier
(74) *Attorney, Agent, or Firm* — Paratus Law Group, PLLC

(57) ABSTRACT

There is provided an image processing device, an image processing method, and a program capable of switching a viewpoint more appropriately. The processing device includes a virtual image generation unit that generates a virtual image based on viewpoint image-related information related to a first viewpoint image and model data corresponding to a subject of the viewpoint image according to band information regarding transmission of the viewpoint image, and a display control unit that performs control to display the generated virtual image before displaying the first viewpoint image. For example, the present technology can be applied to a reproduction device that reproduces VR content.

20 Claims, 12 Drawing Sheets

(56) References Cited

FOREIGN PATENT DOCUMENTS

| JP | 2020-507239 A | 3/2020 |
|----|---------------|--------|
| WO | WO 2018/030206 A1 | 2/2018 |
| WO | WO 2019/031005 A1 | 2/2019 |

\* cited by examiner

IMAGE PROCESSING DEVICE, IMAGE PROCESSING METHOD, AND PROGRAM

CROSS REFERENCE TO PRIOR APPLICATION

This application is a National Stage Patent Application of PCT International Patent Application No. PCT/JP2021/025088 (filed on Jul. 2, 2021) under 35 U.S.C. § 371, which claims priority to Japanese Patent Application No. 2020-123092 (filed on Jul. 17, 2020), which are all hereby incorporated by reference in their entirety.

TECHNICAL FIELD

The present technology relates to an image processing device, an image processing method, and a program, and particularly relates to an image processing device, an image processing method, and a program capable of switching a viewpoint more appropriately.

BACKGROUND ART

In recent years, research and development for providing a new experience by allowing a space created by a computer such as virtual reality (VR) to be perceived as reality have been actively conducted.

For example, Patent Document 1 discloses a technology related to a reproduction device that reproduces free viewpoint image data that enables reproduction of an image from any viewpoint.

CITATION LIST

Patent Document

Patent Document 1: Japanese Patent Application Laid-Open No. 2015-187797

SUMMARY OF THE INVENTION

Problems to be Solved by the Invention

Incidentally, in a case where any viewpoint can be selected, when a new viewpoint is selected by the user, a waiting time occurs until an image of the new viewpoint can be reproduced, and thus it is required to switch the viewpoint more appropriately in consideration of the waiting time.

The present technology has been made in view of such a situation, and enables more appropriate viewpoint switching.

Solutions to Problems

An image processing device according to one aspect of the present technology is an image processing device including a virtual image generation unit that generates a virtual image based on viewpoint image-related information related to a first viewpoint image and model data corresponding to a subject of the viewpoint image according to band information regarding transmission of the viewpoint image, and a display control unit that performs control to display the generated virtual image before displaying the first viewpoint image.

An image processing method according to one aspect of the present technology is an image processing method including, by an image processing device, generating a virtual image based on viewpoint image-related information related to a first viewpoint image and model data corresponding to a subject of the viewpoint image according to band information regarding transmission of the viewpoint image, and performing control to display the generated virtual image before displaying the first viewpoint image.

A program according to one aspect of the present technology is a program for causing a computer to function as a virtual image generation unit that generates a virtual image based on viewpoint image-related information related to a first viewpoint image and model data corresponding to a subject of the viewpoint image according to band information regarding transmission of the viewpoint image, and a display control unit that performs control to display the generated virtual image before displaying the first viewpoint image.

In the image processing device, the image processing method, and the program according to one aspect of the present technology, a virtual image based on viewpoint image-related information related to a first viewpoint image and model data corresponding to a subject of the viewpoint image is generated according to band information regarding transmission of the viewpoint image, and the generated virtual image is controlled to be displayed before the first viewpoint image is displayed.

The image processing device according to one aspect of the present technology may be an independent device or an internal block constituting one device.

MODE FOR CARRYING OUT THE INVENTION

1. Embodiments of Present Technology

Configuration Example of System

Figure 1:
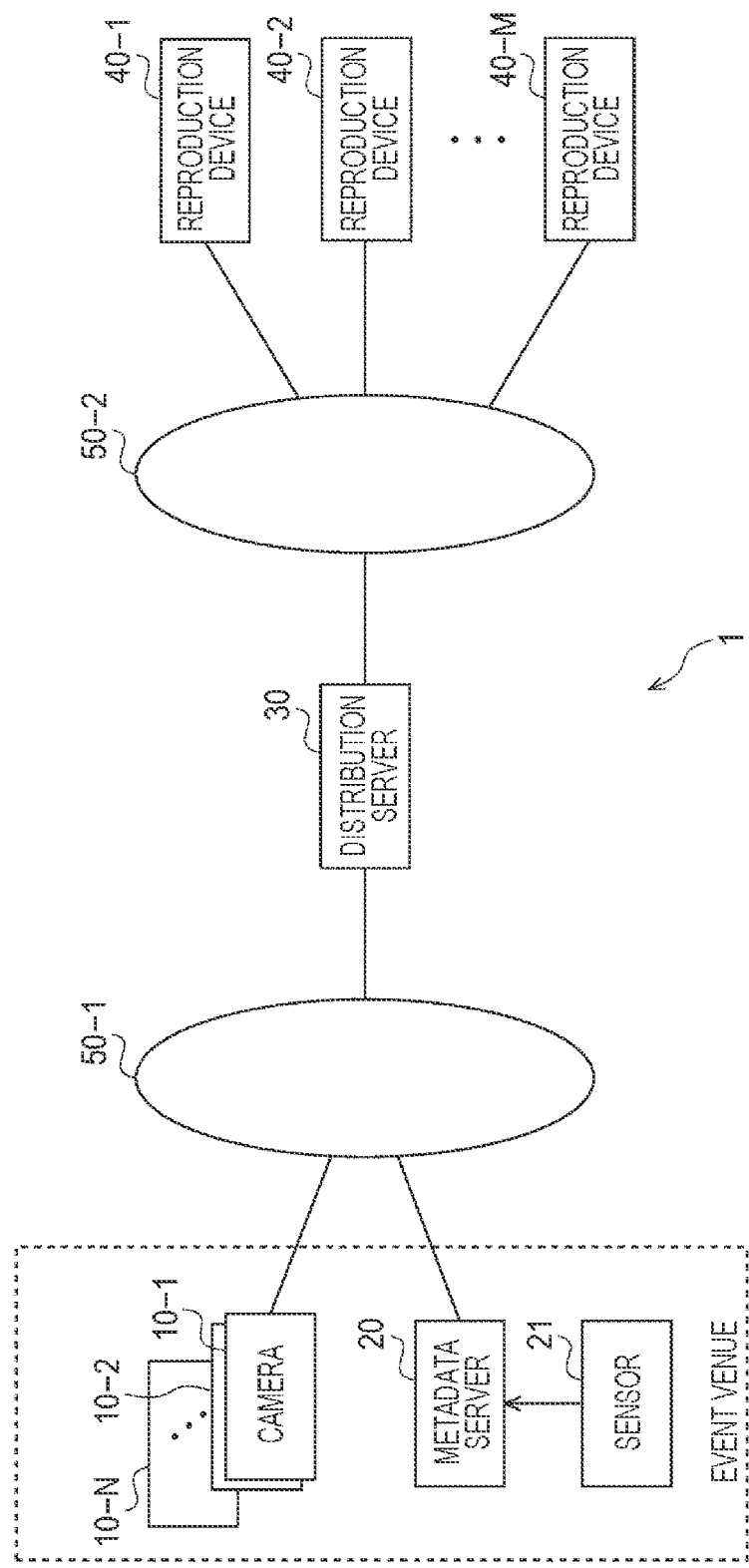
FIG. 1 is a diagram illustrating a configuration example of a content distribution system to which the present technology is applied.

FIG. 1 illustrates a configuration example of a content distribution system to which the present technology is applied.

The content distribution system 1 is a system that distributes content (VR content) such as a VR video and provides a service for allowing a user to view the content.

In FIG. 1, a content distribution system 1 includes cameras 10-1 to 10-N, a metadata server 20, a sensor 21, a distribution server 30, and reproduction devices 40-1 to 40-M. Here, N and M are integers of 1 or more.

For example, in a case where VR content such as a music concert is distributed, the cameras 10-1 to 10-N and the various sensors 21 are installed in an event venue such as a venue of the music concert. The cameras 10-1 to 10-N are respectively installed at places where a performer on the stage can be imaged from various angles. Furthermore, the various sensors 21 are installed at places where a detection target can be detected, and are connected to the metadata server 20.

The camera 10-1 includes an optical system, an image sensor, a signal processing circuit, and the like. The camera 10-1 is installed at a predetermined place in the event venue and images the performer on the stage. It can be said that a captured image captured by the camera 10-1 is a viewpoint image captured from a first viewpoint position.

Each of the cameras 10-2 to 10-N is configured similarly to the camera 10-1, and captures the performer on the stage from a predetermined place where each of the cameras is installed, and thereby viewpoint images from different viewpoint positions are captured.

The sensors 21 include sensors such as a physical sensor and a distance measurement sensor. The physical sensor is a sensor that detects an electrical or magnetic quantity, a mechanical quantity, and a physical quantity such as light and temperature. The distance measurement sensor is a sensor that measures a distance to an object by a method such as time of flight (ToF).

The metadata server 20 generates metadata related to viewpoint images on the basis of sensor data detected by the various sensors 21 and viewpoint image data captured by the cameras 10-1 to 10-N. This metadata includes meta-information such as information regarding the viewpoint position of the viewpoint image and information regarding a subject in the viewpoint image.

The viewpoint image data captured by the cameras 10-1 to 10-N and data such as the metadata generated by the metadata server 20 are transmitted to the distribution server 30 via the network 50-1. The network 50-1 includes a communication network such as the Internet, an intranet, or a mobile phone network, and may be a dedicated line.

The distribution server 30 is a server (cloud server) that distributes content, and is installed in a data center or the like. The distribution server 30 receives data such as the viewpoint image data and the metadata via the network 50-1, and performs processing for enabling distribution of VR content such as a music concert.

The reproduction device 40-1 is a device capable of reproducing content such as a head mounted display (HMD). The reproduction device 40-1 transmits a VR content distribution request to the distribution server 30 via a network 50-2 according to an operation from the user. The network 50-2 includes a communication network such as the Internet, an intranet, or a mobile phone network.

In a case of receiving the distribution request from the reproduction device 40-1, the distribution server 30 transmits VR content data according to the distribution request to the reproduction device 40-1 via the network 50-2. The VR content data includes the viewpoint image data, the metadata, and the like. Thus, in the reproduction device 40-1, the VR content such as a music concert is reproduced and viewed by the user.

The reproduction devices 40-2 to 40-M are configured similarly to the reproduction device 40-1, and can reproduce the VR content distributed from the distribution server 30. In the following description, the reproduction devices 40-1 to 40-M will be referred to as a reproduction device 40 in a case where it is not particularly necessary to distinguish them. Furthermore, the network 50-1 and the network 50-2 are not limited to different networks, and may be the same network, and will be hereinafter described as a network 50.

In the content distribution system 1 configured as described above, the performer who is performing on the stage in the event venue is imaged from various angles by the plurality of cameras 10, and thus, in the reproduction device 40 that reproduces VR content such as a music concert, it is possible to display the performer according to various viewpoints as the subject in the viewpoint image.

Figure 2:
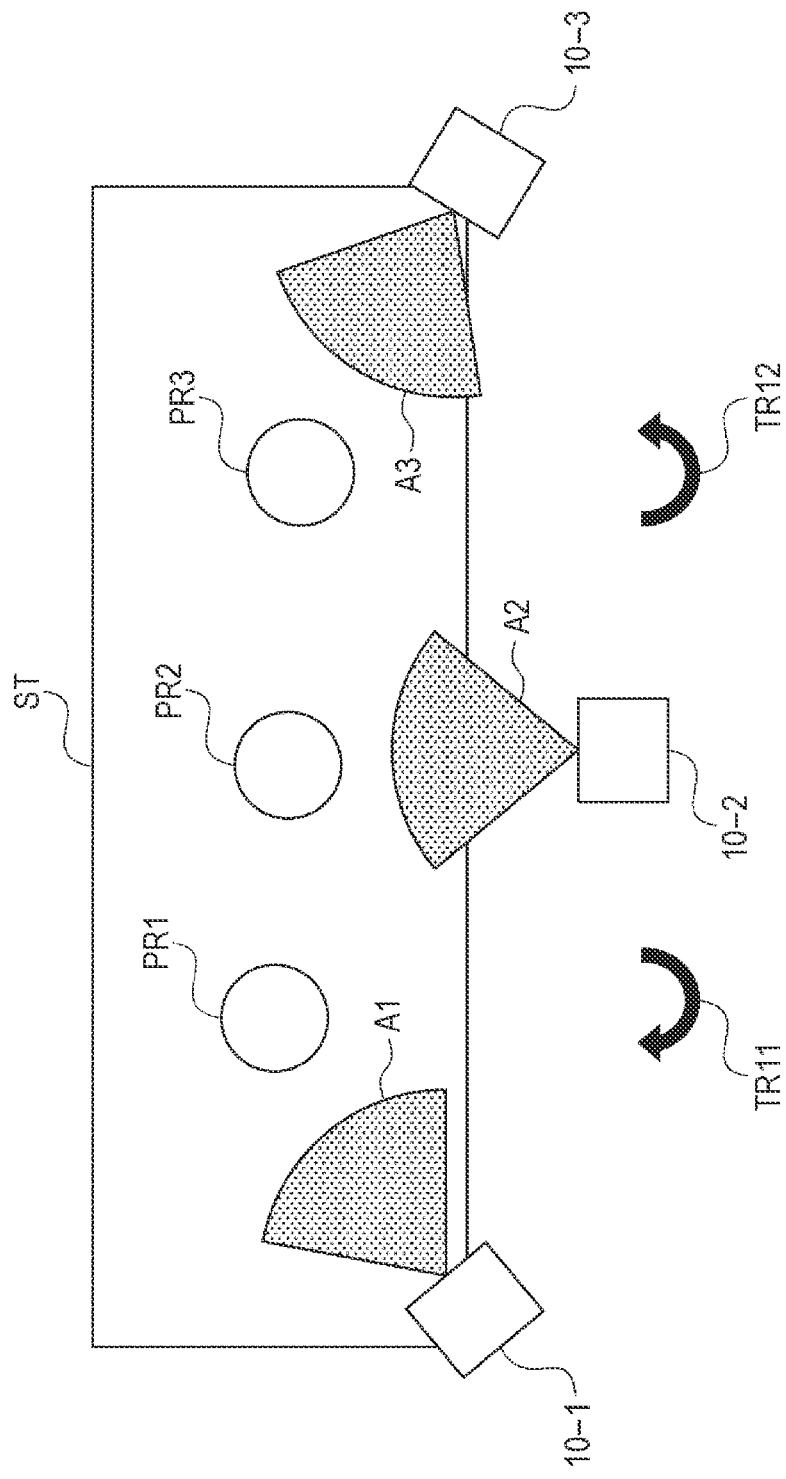
FIG. 2 is a diagram illustrating an example of switching a plurality of viewpoints.

For example, as illustrated in FIG. 2, a scene is assumed in which a trio of a performer PR1, a performer PR2, and a performer PR3 performs music at a stage ST in an event venue. In the example of FIG. 2, toward the stage ST, the camera 10-1 is installed on the left side, the camera 10-2 is installed on the front side, and the camera 10-3 is installed on the right side.

Figure 3:
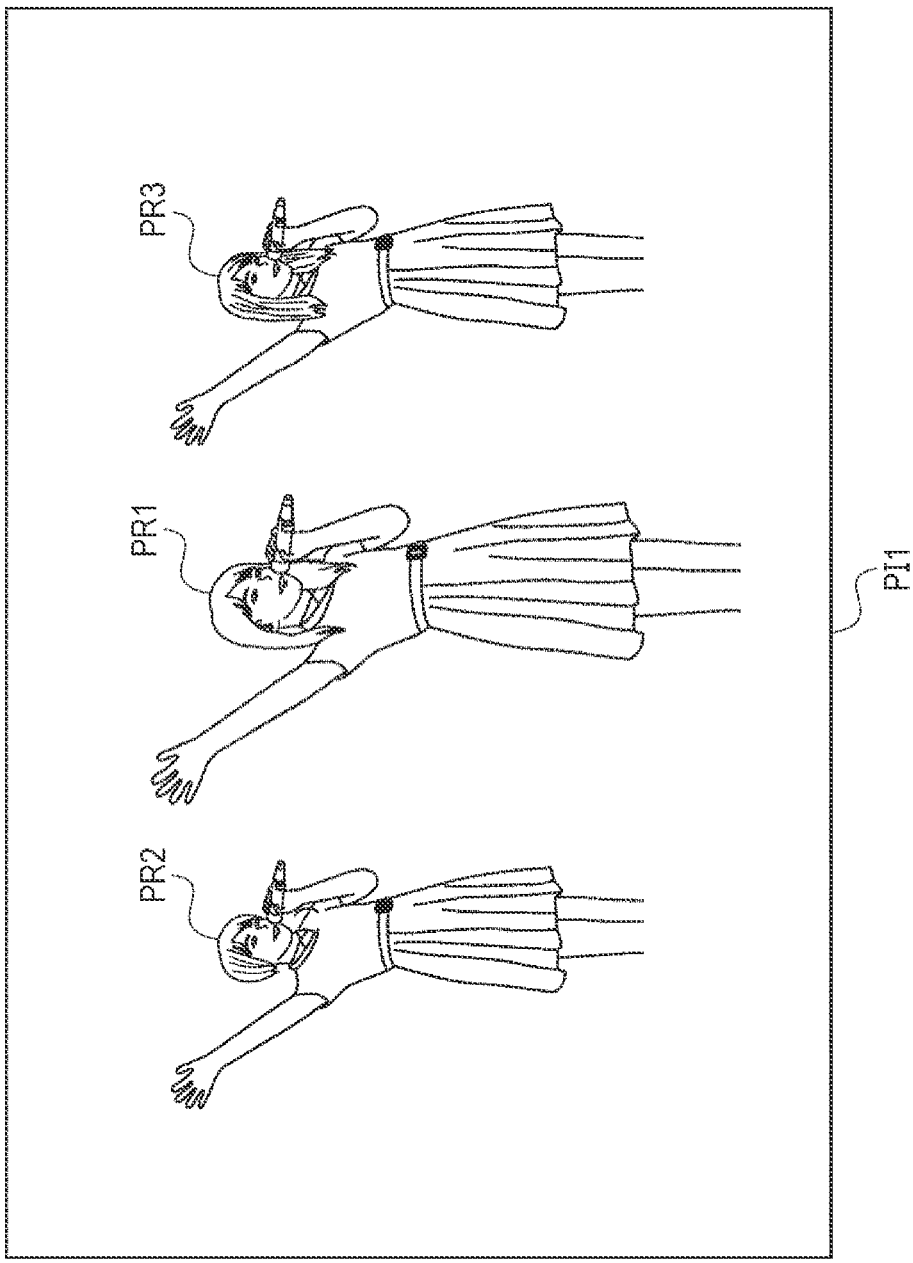
FIG. 3 is a diagram illustrating an example of a viewpoint image corresponding to a first viewpoint.

An angle of view A1 of the camera 10-1 includes three performers as subjects, but since the camera 10-1 is installed on the left side toward the stage ST, for example, a viewpoint image PI1 as illustrated in FIG. 3 is obtained as a captured image.

Figure 4:
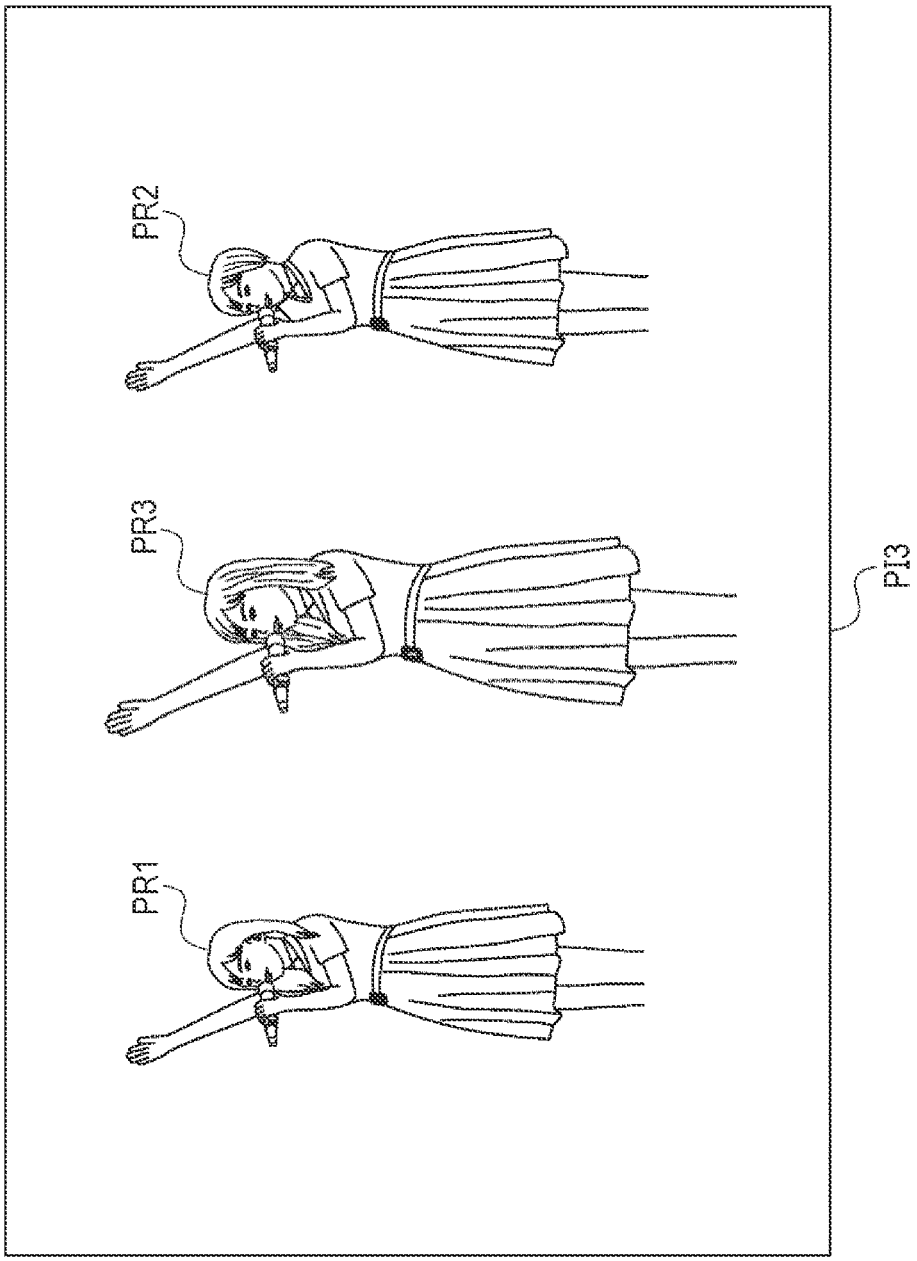
FIG. 4 is a diagram illustrating an example of a viewpoint image corresponding to a second viewpoint.

An angle of view A3 of the camera 10-3 includes three performers as subjects, but since the camera 10-3 is installed on the right side toward the stage ST, for example, a viewpoint image PI3 as illustrated in FIG. 4 is obtained as a captured image.

Although not illustrated, since the camera 10-2 is installed in front of the stage ST, a viewpoint image capturing three performers from the front within the range of an angle of view A2 is obtained as a captured image.

At this time, in a case where the user who is viewing the VR content of the music concert on the reproduction device 40 performs an operation of switching his/her own viewpoint from the viewpoint $P_C$ according to the angle of view A2 of the front camera 10-2 to the viewpoint $P_N$ according to the angle of view A1 of the left camera 10-1, the viewpoint transitions from the current viewpoint $P_C$ to the new viewpoint $P_N$ (viewpoint transition TR 11 in FIG. 2).

Furthermore, in a case where the user who is viewing the VR content on the reproduction device 40 performs an operation of switching his/her own viewpoint from the viewpoint $P_C$ according to the angle of view A2 of the front camera 10-2 to the viewpoint $P_N$ according to the angle of view A3 of the right camera 10-3, the viewpoint transitions from the current viewpoint $P_C$ to the new viewpoint $P_N$ (viewpoint transition TR12 in FIG. 2).

As described above, in a case where the user who is viewing the VR content can select a plurality of viewpoints on the reproduction device 40, when viewpoint transition (viewpoint transitions TR11 and TR12 in FIG. 2) is performed from the viewpoint $P_C$ before switching to the viewpoint $P_N$ after switching, at present, the viewpoint image is switched after a certain waiting time elapses until the viewpoint image (viewpoint image PI1 in FIG. 3 and viewpoint image PI3 in FIG. 4) according to the viewpoint $P_N$ after switching becomes a reproducible state.

Therefore, in the reproduction device 40, in a case where the user who is viewing the VR content can select a plurality of viewpoints, there occurs a problem that it takes time to complete switching of viewpoints due to viewpoint transition, or it is difficult to grasp a new viewpoint after the viewpoint is switched.

Accordingly, the content distribution system 1 solves such a problem and enables more appropriate viewpoint switching in a case where the user can select a plurality of viewpoints.

That is, in the content distribution system 1, at the time of transmitting the viewpoint image, metadata including meta-information such as information regarding the viewpoint position of the viewpoint image and information regarding the subject in the viewpoint image, and model data corresponding to the subject in the viewpoint image are generated and transmitted to the reproduction device 40. The reproduction device 40 generates a virtual image based on the metadata and the model data, and displays the virtual image until preparation for reproduction of a viewpoint image at a new viewpoint after the viewpoint is switched is completed.

(Display Example of Virtual Image)

Figure 5:
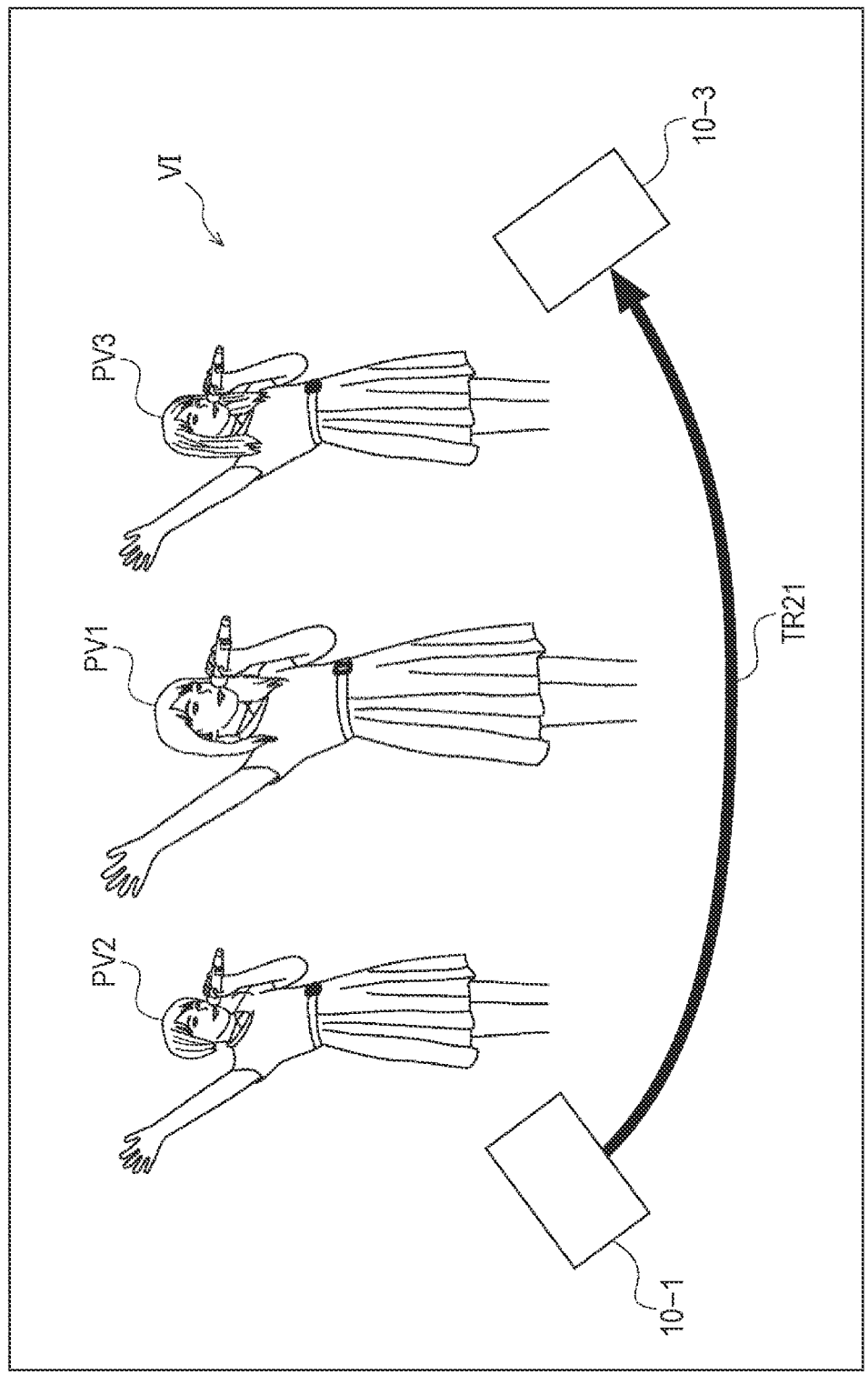
FIG. 5 is a diagram illustrating an example of a virtual image displayed at a time of switching a plurality of viewpoints.

FIG. 5 illustrates an example of a virtual image displayed at the time of switching a plurality of viewpoints.

In FIG. 5, in the reproduction device 40, in a case where the user who is viewing the VR content performs an operation of switching his/her own viewpoint from the viewpoint $P_C$ according to the angle of view A1 of the left camera 10-1 to the viewpoint $P_N$ according to the angle of view A3 of the right camera 10-3, the viewpoint transitions from the viewpoint $P_C$ before switching to the viewpoint $P_N$ after switching (viewpoint transition TR21 in FIG. 5).

At this time, in the reproduction device 40, a virtual image VI is displayed while the viewpoint transition is performed, that is, from when the operation of switching the viewpoint $P_C$ before switching is performed until preparation of reproduction of the viewpoint image (viewpoint image PI3 in FIG. 4) at the viewpoint $P_N$ after switching is completed. For example, the reproduction device 40 can display the virtual image VI according to the viewpoint (the position of a virtual camera) that transitions between viewpoints from the viewpoint $P_C$ before switching to the viewpoint $P_N$ after switching.

The virtual image VI includes a character PV1, a character PV2, and a character PV3 corresponding to the performer PR1, the performer PR2, and the performer PR3 on the stage ST. That is, since the metadata includes generation information of the subject in the viewpoint image PI and the model data includes the image related to the specific character associated with the subject, the 3D character PV corresponding to the performer PR as the subject can be generated.

FIG. 5 illustrates a case where the 3D character PV corresponding to the performer PR is displayed as the virtual image VI, but the virtual image VI is not limited to the 3D character, and is only required to be, for example, an image associated with the subject of the viewpoint image PI, such as a 3D model of a real image.

The virtual image VI is not limited to a three-dimensional image of a 3D character or the like, and may be a two-dimensional image of a 2D character or the like. For example, in consideration of a processing load of the reproduction device 40, the load is higher when the three-dimensional virtual image VI is displayed than when the two-dimensional virtual image VI is displayed, and thus the two-dimensional virtual image VI or the three-dimensional virtual image VI can be displayed according to the processing capability (such as the performance of the processor) of the reproduction device 40.

Furthermore, in the content distribution system 1, a virtual image based on the metadata and the model data is generated according to the band information regarding transmission of the viewpoint image. That is, in a case where the network 50 is a best effort network or the like, the band information is used because the time required for switching the viewpoint changes due to a difference in the band of the network 50 depending on the environment in which the user uses the reproduction device 40.

For example, in the reproduction device 40, when the viewpoint is transitioned in accordance with a viewpoint switching operation by the user, the virtual image VI according to the viewpoint (the position of the virtual camera) for transitioning between the viewpoints before and after switching can be displayed, and a transition path and transition speed of the viewpoint can be adjusted in accordance with the band information.

Specifically, the reproduction device 40 can determine trajectory information using the band information when generating the virtual image VI according to trajectory information of the viewpoint $P_C$ before switching and the viewpoint $P_N$ after switching on the basis of viewpoint position information regarding the viewpoint position of the viewpoint $P_C$ before switching and viewpoint position information regarding the viewpoint position of the viewpoint $P_N$ after switching. The trajectory information includes information regarding the transition path between viewpoints before and after switching and information regarding the transition speed.

Furthermore, the reproduction device 40 can calculate the time required for transition from the viewpoint $P_C$ before switching to the viewpoint $P_N$ after switching (time required from start to completion of viewpoint switching) on the basis of the band information of the network 50, set the transition path to a shortest path when the transition time is shorter than a predetermined value, and set a detour path as the transition path when the transition time is longer than the predetermined value.

That is, since there is a relationship in which the length of the transition path becomes shorter as the band amount is larger and the length of the transition path becomes longer as the band amount is smaller, the band amount indicated by the band information and the length of the transition path (trajectory distance) indicated by the trajectory information have a negative correlation.

Figure 6:
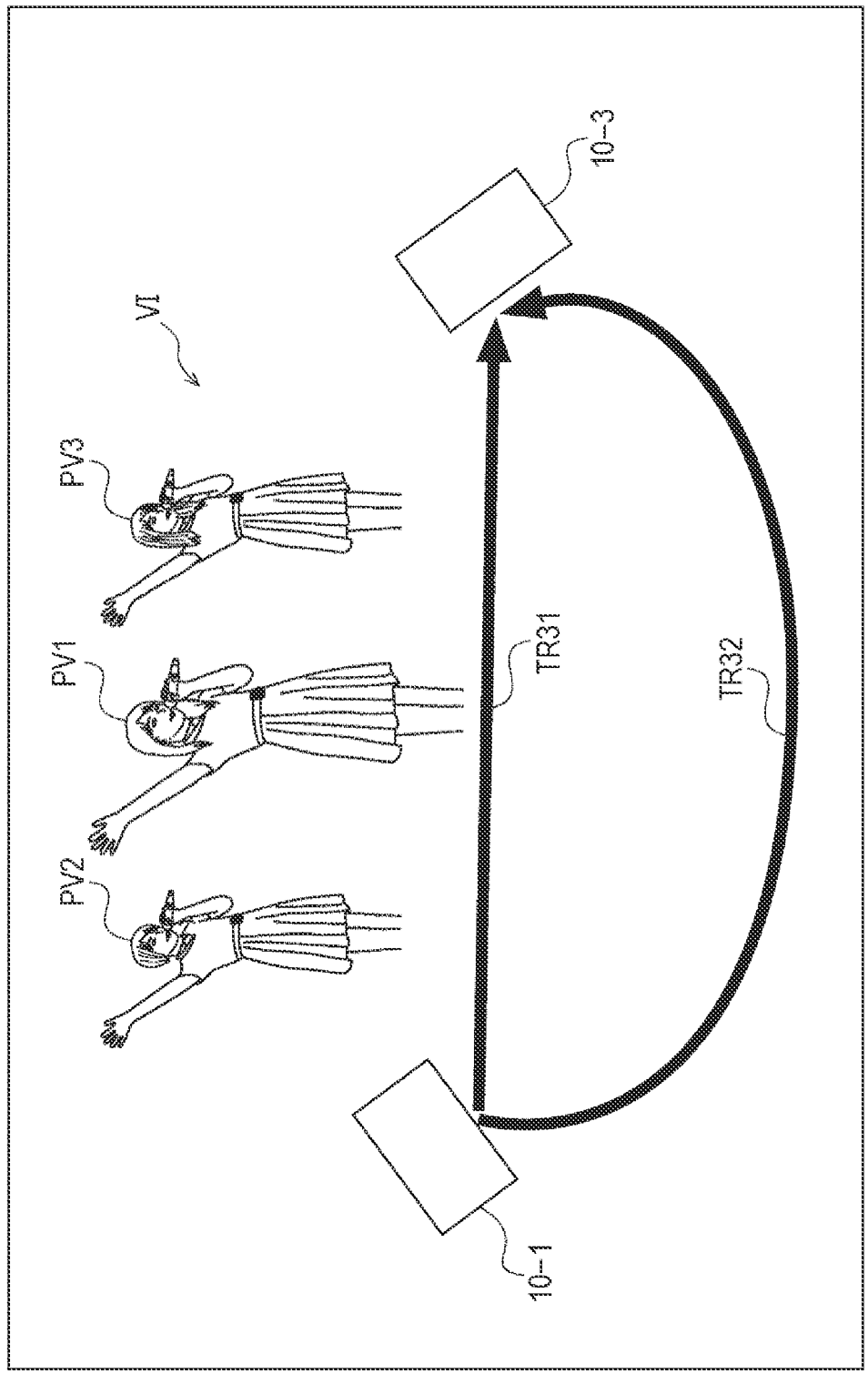
FIG. 6 is a diagram illustrating an example of setting of transition paths according to a band at the time of switching the plurality of viewpoints.

FIG. 6 illustrates an example of setting of a transition path according to a band at the time of switching a plurality of viewpoints.

In FIG. 6, in a case where the transition time according to the band is shorter than a predetermined value, a viewpoint transition TR31 is set as the shortest path between the viewpoint $P_C$ before switching and the viewpoint $P_N$ after switching. On the other hand, in a case where the transition time according to the band is longer than the predetermined value, a viewpoint transition TR32 is set as a more detour route. In either case where the viewpoint transition TR31 or the viewpoint transition TR32 is set, the virtual image VI according to the viewpoint to transition between the viewpoints before and after switching is displayed.

In the example of FIG. 6, the length of the transition path is changed by threshold determination of the transition time according to the band, but the transition speed of the viewpoint transitioning between the viewpoints, and the like may be changed. That is, in a case where the path of the viewpoint transition is set to the same path and the transition time according to the band is shorter than the predetermined value, the transition speed of the viewpoint is set to a higher speed, and on the other hand, in a case where the transition time according to the band is longer than the predetermined value, it is possible to make a difference in speed such as setting the transition speed of the viewpoint to a slower speed.

Furthermore, both the length of the transition path and the speed of the transition speed may be adjusted by threshold determination of the transition time according to the band. Moreover, the processing capability of the reproduction device 40 may be taken into consideration when performing the threshold determination of the transition time according to the band. The processing capability includes the performance of the processor, the capacity of the memory, the resolution of the display, and the like.

Note that, in a case where a predetermined operation is performed by the user in the middle of the viewpoint transition according to the viewpoint switching operation, the reproduction device 40 may stop the viewpoint transition and switch to the viewpoint after switching according to the operation. Furthermore, what. is called. VR. sickness can be suppressed by darkening the periphery of the field of view of the user using the reproduction device 40 according to the transition speed of the viewpoint.

Furthermore, in the reproduction device 40, the viewpoint image PI before and after switching of the viewpoint may be instantaneously switched in accordance with the viewpoint switching operation, and the virtual image VI may be hidden. For example, a case where the virtual image VI is not displayed corresponds to a case where the band amount is larger than the predetermined value on the basis of the band information of the network 50, and the like. However, even in a case where the virtual image VI is hidden, information regarding the transition of the viewpoint is presented to the user.

Figure 7:
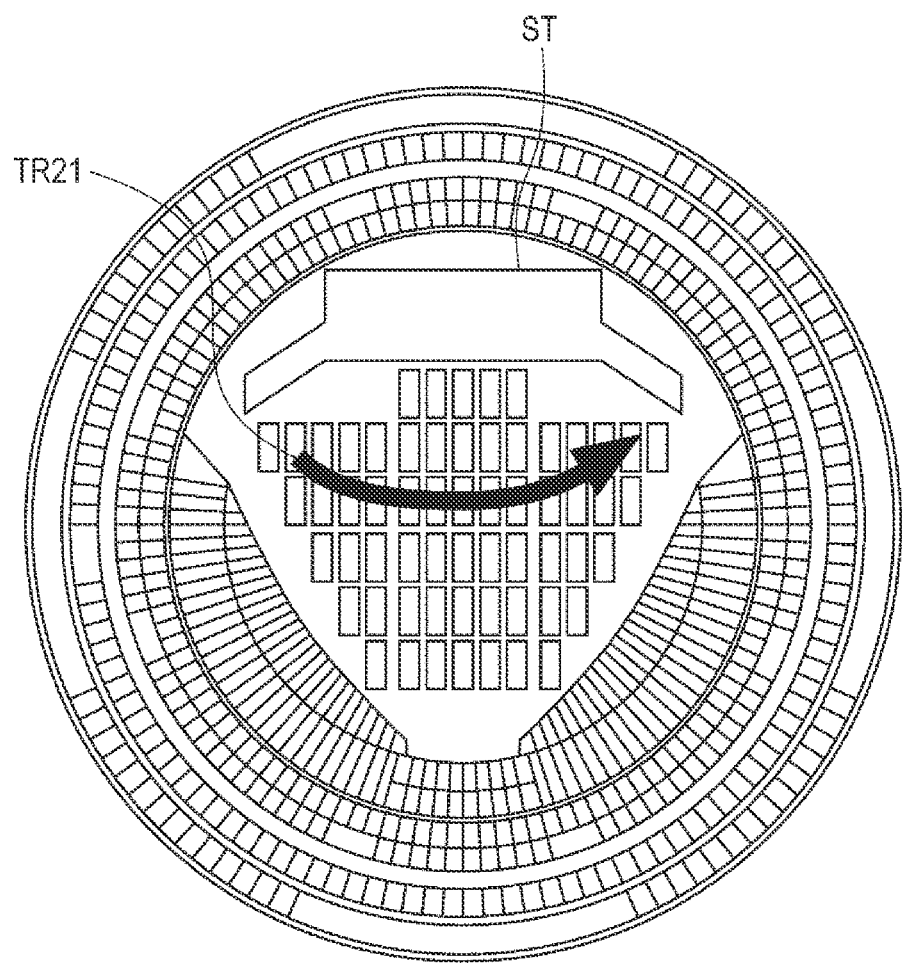
FIG. 7 is a diagram illustrating an example of a transition path displayed on a map of an event venue.

For example, as illustrated in FIG. 7, in the reproduction device 40, an image including information indicating the viewpoint transition TR21 is displayed on the map of the event venue on the basis of the viewpoint position information regarding the viewpoint position of the viewpoint $P_C$ before switching and the viewpoint position information regarding the viewpoint position of the viewpoint $P_N$ after switching. Thus, the user can recognize what kind of viewpoint movement has been performed by checking the displayed map. Note that the display example of FIG. 7 is an example, and for example, a character or the like corresponding to the performer on the stage ST may be displayed on the map of the event venue together with the information regarding the transition of the viewpoint.

In this manner, by displaying the virtual image at the time of switching the plurality of viewpoints, the user can enjoy viewing the virtual image even during a waiting time until completion of the viewpoint switching. Furthermore, by displaying the virtual image according to the viewpoint transitioning between the viewpoints before and after switching, the user can grasp where the next viewpoint will be.

(Configuration Example of Metadata)

As described above, the metadata includes the meta-information such as the information regarding the viewpoint position of a viewpoint image and the information regarding the subject in the viewpoint image, and more specifically, the following information is included as viewpoint image-related information related to the viewpoint image.

That is, the metadata includes, as the information regarding the viewpoint position of the viewpoint image, information regarding the position, posture, angle of view, and the like of the camera 10 that captures the viewpoint image. Furthermore, the metadata includes information regarding the position, posture, time, and the like corresponding to the subject (performer) as the information regarding the subject in the viewpoint image. The information regarding the subject may include information specifying the subject such as the name of the performer.

The metadata may include information regarding a space in which a subject (performer) exists in an event venue or the like, and information regarding various objects existing in the space. For example, the information regarding the event venue can include control information such as a spotlight and lighting. Furthermore, the information regarding various objects can include information regarding the clothes of the performer, the type and position of the musical instrument, and the like.

These pieces of metadata are generated by the metadata server 20, but information that can be analyzed by analysis processing such as information regarding the object may be provided on the basis of a result of the analysis processing on the side of the distribution server 30 or an external server (not illustrated).

In the reproduction device 40 as the timing of acquiring the metadata, for example, there is the following timing. That is, the reproduction device 40 always acquires the metadata repeatedly transmitted from the distribution server 30 at a predetermined interval. In this manner, by always acquiring the metadata, when the user performs the viewpoint switching operation, the processing can be instantly started using the acquired metadata.

Furthermore, when the user performs the viewpoint switching operation (for example, pressing of a switching button), the reproduction device 40 requests the metadata from the distribution server 30, thereby acquiring the metadata transmitted from the distribution server 30. At this time, by including information specifying the viewpoint to be switched in the metadata request, only the necessary information regarding the camera 10 may be acquired.

Note that these acquisition timings may be combined, and for example, meta-information that is always acquired and meta-information that starts acquisition at a timing when the viewpoint switching operation is performed may be included as metadata. That is, the acquisition timing can be made different for each Piece of Meta-Information Included in the Metadata.

(Application example of network slicing)

The content distribution system 1 can use a network slicing technique when transmitting data via the network 50. Network slicing is a technique of virtually dividing network resources and performing communication control according to each use. Applications here include high reliability, low delay, high speed, large capacity, and the like.

For example, in the content distribution system 1, the metadata server 20 associates slice-related information for specifying a highly reliable slice to be allocated with each piece of the meta-information included in the metadata so that the metadata including the meta-information such as the information regarding the position, posture, and angle of view of the camera 10 and the information regarding the position, posture, and the like of the subject (performer) of the viewpoint image can be transmitted by the highly reliable slice. Then, in a base station (not illustrated) through which the metadata server 20 and the distribution server 30 are connected, each piece of the meta-information is allocated to a slice specified on the basis of the slice-related information, so that each piece of meta-information is transmitted to the distribution server 30 using the highly reliable slice.

Here, the slice-related information is not particularly limited as long as the slice to be allocated can be specified, and examples thereof include naming of each piece of meta-information and assigning an ID corresponding to the slice to be allocated to each piece of meta-information. Furthermore, the slice is exemplified with high reliability, low delay, and high speed and large capacity, but is not limited thereto, and may be any slice set by virtual division.

Furthermore, also in a case where various kinds of metadata are transmitted from the distribution server 30 to the reproduction device 40, the network slicing technique can be similarly used. In this case, the slice-related information is associated with each piece of meta-information similarly to the case that various pieces of the meta-information are transmitted from the metadata server 20 to the distribution server 30. Then, each piece of the meta-information is transmitted using a slice specified by the slice-related information associated with each piece of the meta-information in the base station (not illustrated) through which the distribution server 30 and the reproduction device 40 are connected.

Here, all the pieces of meta-information may be set to the highly reliable slice, but for example, only the minimum necessary meta-information (for example, information regarding the position and posture of the subject and the position of the viewpoint after switching) may be controlled to be transmitted in the highly reliable slice. Alternatively, in a case where the metadata is continuously transmitted at all times, the meta-information may be controlled to be continuously transmitted in the highly reliable slice at all times. Moreover, only in a case where a viewpoint switching instruction is given by the user, control may be performed so as to perform transmission with the highly reliable slice.

As described above, by transmitting data such as the viewpoint image data in a state where the band for transmitting the metadata is secured with high reliability using the network slicing technique, the reproduction device 40 can reliably receive the metadata. Thus, the reproduction device 40 can reduce the processing load when displaying the virtual image at the time of viewpoint switching. Note that, since the metadata has a smaller data amount than the viewpoint image data and the like, the metadata is data for which the band is easily secured as compared with other data.

Note that, in a case where the network 50 includes a wireless communication network such as a fifth generation mobile communication system (5G: 5th Generation), the distribution server 30 may be configured as a device on a radio access network (RAN) side.

(Configuration of Each Device)

Figure 8:
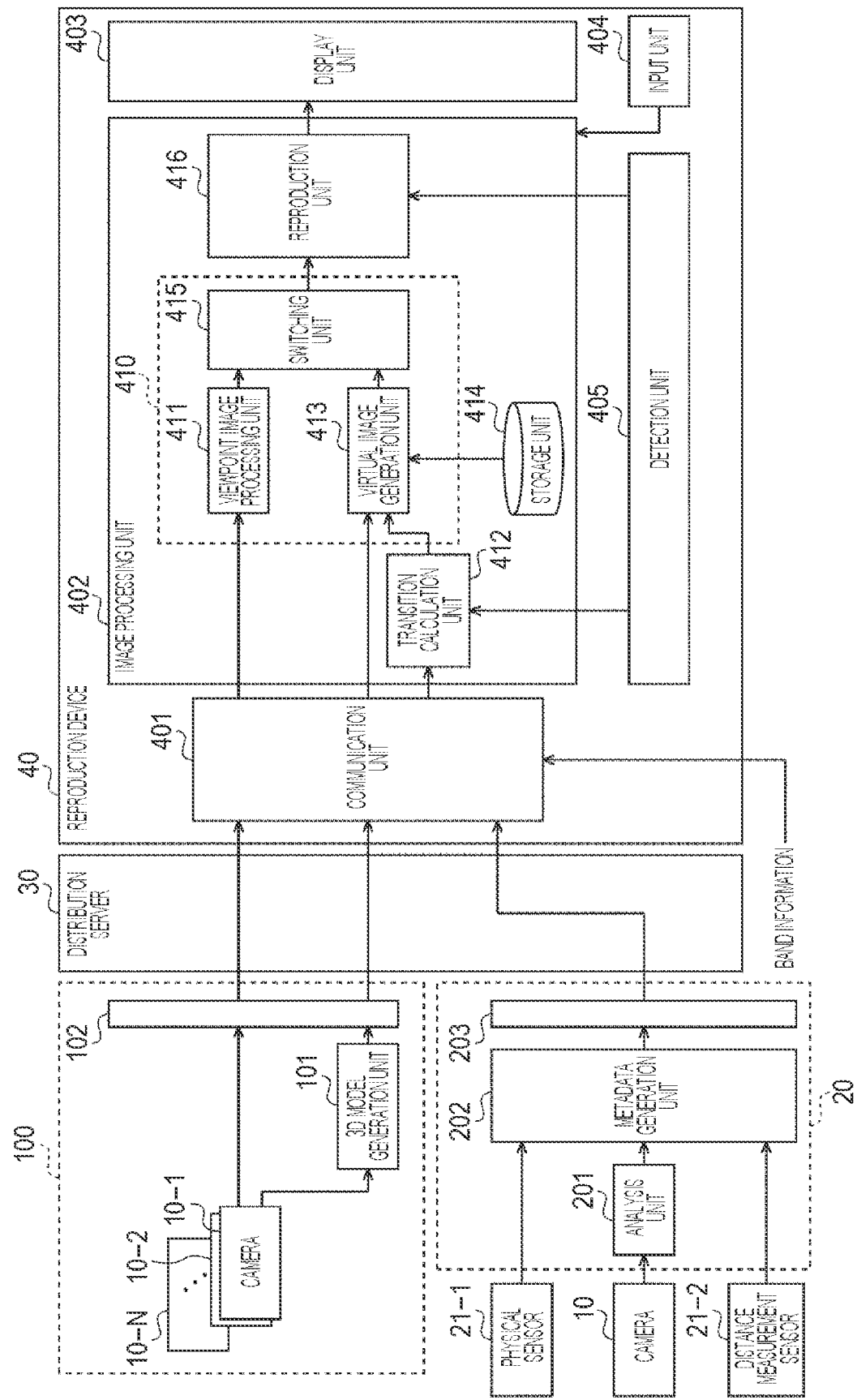
FIG. 8 is a diagram illustrating a configuration example of each device of the content distribution system to which the present technology is applied.

FIG. 8 illustrates a configuration example of each device of the content distribution system to which the present technology is applied.

The camera system 100 includes cameras 10-1 to 10-N, a 3D model generation unit 101, and a communication unit 102.

The cameras 10-1 to 10-N are installed at predetermined places in the event venue, respectively. Each of the cameras 10-1 to 10-N images the performer on the stage from the place where the camera itself is installed, and supplies viewpoint image data from different viewpoint positions to the 3D model generation unit 101 and the communication unit 102.

The 3D model generation unit 101 generates 3D model data corresponding to the subject (performer) in the viewpoint image on the basis of the viewpoint image data supplied from the cameras 10-1 to 10-N, and supplies the 3D model data to the communication unit 102. The 3D model data is data of a 3D model of a real image.

The communication unit 102 transmits the viewpoint image data supplied from the cameras 10-1 to 10-N and the 3D model data supplied from the 3D model generation unit 101 to the distribution server 30 via the network 50.

The metadata server 20 includes an analysis unit 201, a metadata generation unit 202, and a communication unit 203.

A physical sensor 21-1 is installed at a predetermined place in the event venue, detects a physical quantity such as an electrical or magnetic quantity, and supplies sensor data according to a detection result thereof to the metadata generation unit 202. A distance measurement sensor 21-2 is installed at a predetermined place in the event venue, and supplies sensor data according to a measurement result of the distance to an object to the metadata generation unit 202.

The analysis unit 201 analyzes the viewpoint image data supplied from the camera 10, and supplies analysis data according to an analysis result thereof to the metadata generation unit 202. Note that the camera 10 is not limited to the cameras 10-1 to 10-N illustrated in FIG. 1 and the like, and may be a camera installed at another place in the event venue.

The metadata generation unit 202 generates metadata on the basis of the sensor data supplied from the physical sensor 21-1 and the distance measurement sensor 21-2 and the analysis data supplied from the analysis unit 201, and supplies the metadata to the communication unit 203.

The metadata generated by the metadata generation unit 202 includes the meta-information such as the information regarding the viewpoint position of the viewpoint image and the information regarding the subject in the viewpoint image. The information regarding the viewpoint position of the viewpoint image includes information regarding the position, posture, angle of view, and the like of the camera 10. The information regarding the subject in the viewpoint image includes information regarding the position and posture corresponding to the subject (performer), and the like.

The communication unit 203 transmits the metadata supplied from the metadata generation unit 202 to the distribution server 30 via the network 50.

The viewpoint image data and the 3D model data transmitted from the camera system 100 and the metadata transmitted from the metadata server 20 are transmitted by the distribution server 30 to the reproduction device 40 via the network 50.

Note that a part of the processing executed by the camera system 100 and the metadata server 20 may be executed by the distribution server 30, the external server (not illustrated), or the like. For example, the processing of generating the 3D model data may be executed by the distribution server 30 or the external server.

The reproduction device 40 includes a communication unit 401, an image processing unit 402, a display unit 403, an input unit 404, and a detection unit 405.

The communication unit 401 is a communication module compatible with wireless communication or wired communication such as wireless local area network (LAN) or cellular communication (for example, LTE-Advanced, 5G, or the like).

The communication unit 401 receives the viewpoint image data, the 3D model data, and the metadata distributed from the distribution server 30 via the network 50, and supplies the viewpoint image data, the 3D model data, and the metadata to the image processing unit 402. Furthermore, the communication unit 401 receives band information of the network 50 from a measurement server (not illustrated) or the like, and supplies the band information to the image processing unit 402. Since the band of the network 50 is not always the same, the band information is periodically acquired. The measurement server is a server that measures the band of the network 50 at that time in response to a request from a device connected to the network 50 and provides the band as band information.

The image processing unit 402 is a player that reproduces content such as VR content. The image processing unit 402 includes a viewpoint image processing unit 411, a transition calculation unit 412, a virtual image generation unit 413, a storage unit 414, a switching unit 415, and a reproduction unit 416. The viewpoint image processing unit 411, the virtual image generation unit 413, and the switching unit 415 constitute a display control unit 410.

The viewpoint image processing unit 411 processes the viewpoint image data supplied from the communication unit 401, and supplies the viewpoint image data according to the viewpoint of the user to the switching unit 415.

On the basis of the metadata and the band information supplied from the communication unit 401 and the terminal position information supplied from the detection unit 405, the transition calculation unit 412 calculates the transition path, the transition speed, and the like of viewpoints transitioning between the viewpoints before and after switching, and supplies the trajectory information including a calculation result thereof to the virtual image generation unit 413.

The virtual image generation unit 413 generates virtual image data on the basis of the 3D model data and the metadata supplied from the communication unit 401 and the trajectory information supplied from the transition calculation unit 412, and supplies the virtual image data to the switching unit 415.

Furthermore, when generating the virtual image data, the virtual image generation unit 413 can use data such as a 3D character or a stage map recorded in the storage unit 414. The storage unit 414 is an auxiliary storage device including a semiconductor memory such as a nonvolatile memory. The storage unit 414 may be configured as an internal storage or may be an external storage such as a memory card.

The switching unit 415 is supplied with the viewpoint image data from the viewpoint image processing unit 411 and the virtual image data from the virtual image generation unit 413. The switching unit 415 switches between the viewpoint image data and the virtual image data, and supplies either one of the viewpoint image data and the virtual image data to the reproduction unit 416.

On the basis of the viewpoint information of the user supplied from the detection unit 405, the reproduction unit 416 performs reproduction processing using the viewpoint image data or the virtual image data supplied from the switching unit 415, and displays the viewpoint image or the virtual image on the display unit 403. The display unit 403 is a display including an organic light emitting diode (OLED) panel, a liquid crystal panel, and the like.

The input unit 404 includes a physical button, a touch sensor, and the like. In a case where the viewpoint switching operation is performed by the user, the input unit 404 supplies operation data according to the operation to the image processing unit 402. In the image processing unit 402, viewpoint switching processing is performed according to the operation data supplied from the input unit 404.

The detection unit 405 has a sensing function by various sensors such as a gyro sensor and an eye tracking function. The detection unit 405 detects information (terminal position information) regarding the position of the reproduction device 40 and information (viewpoint information) regarding the place of the viewpoint (place being viewed) of the user, and supplies the information to the image processing unit 402.

Figure 9:
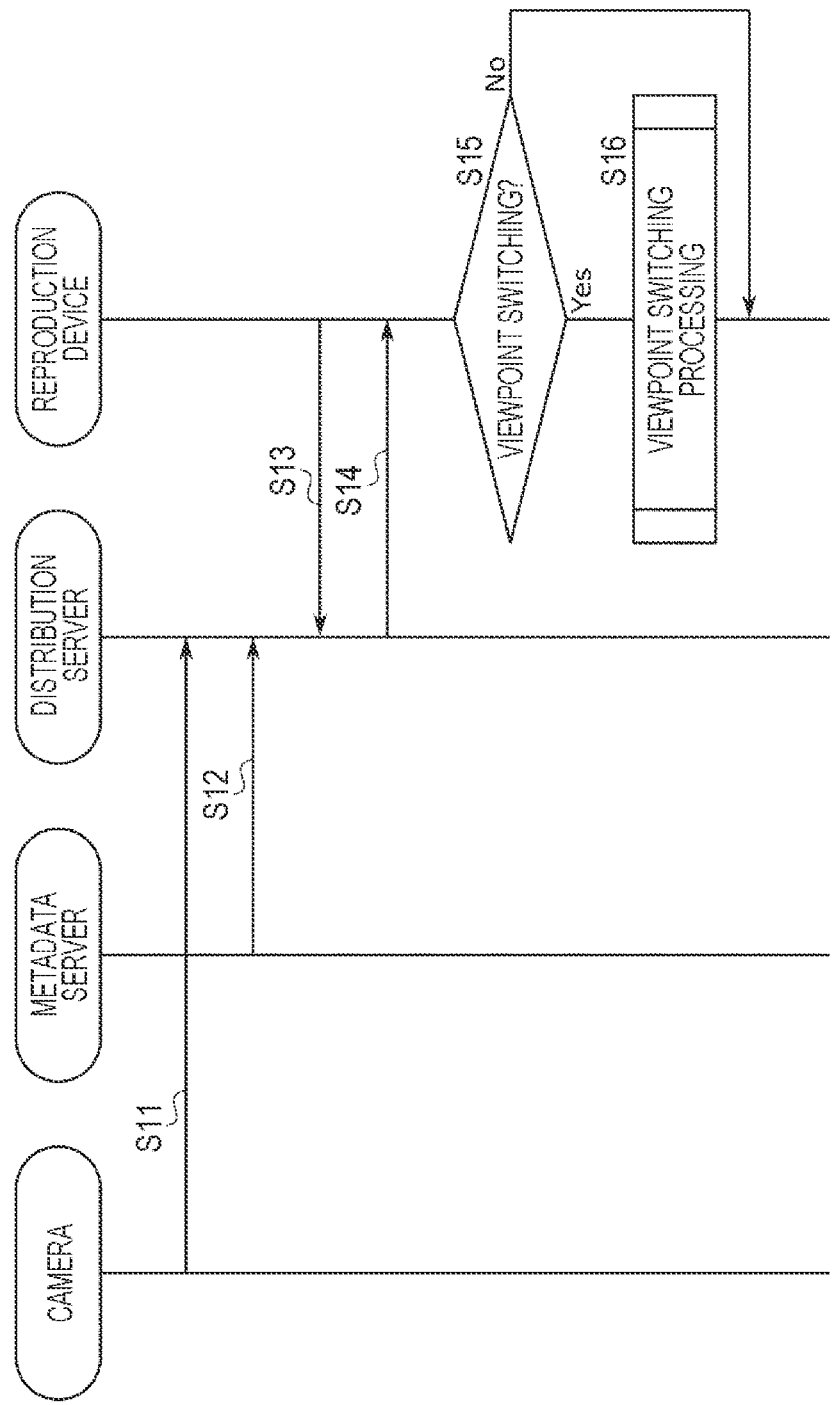
FIG. 9 is a diagram illustrating a flow of data between respective devices in the content distribution system.

FIG. 9 illustrates a flow of data between the respective devices in the content distribution system 1 configured as described above.

The viewpoint image data imaged by the plurality of cameras 10 and the 3D model data thereof, and the metadata generated by the metadata server 20 are transmitted to the distribution server 30 via the network 50 (S11 and S12).

In response to a request from the reproduction device 40, the distribution server 30 transmits the viewpoint image data to the reproduction device 40 via the network 50 (S13 and S14). Thus, the reproduction device 40 displays the viewpoint image according to the viewpoint image data. The metadata and the 3D model data are transmitted at any timing such as repeatedly transmitted at predetermined intervals or transmitted when requested by the reproduction device 40.

In the reproduction device 40, it is determined whether to switch the viewpoint on the basis of the operation data from the input unit 404 (S15). For example, in a case where the viewpoint switching operation is performed by the user and it is determined to switch the viewpoint ("Yes" in S15), the processing proceeds to step S16.

In step S16, the reproduction device 40 executes the viewpoint switching processing. The viewpoint switching processing will be described later in detail with reference to the flowcharts in FIGS. 10 and 11.

(Flow of Viewpoint Switching Processing)

First, a first example of the viewpoint switching processing corresponding to step S16 in FIG. 9 will be described with reference to the flowchart in FIG. 10. However, in the first example, it is assumed that metadata and the like transmitted from the distribution server 30 at predetermined intervals have been acquired.

In step S101, the transition calculation unit 412 determines whether the band amount indicated by the band information of the network 50 is equal to or less than the predetermined value. The predetermined value can be a predetermined fixed value or a variable value corresponding to the processing capability (such as the performance of the processor) of the reproduction device 40.

In a case where it is determined in the determination processing of step S101 that the band amount is equal to or less than the predetermined value, the processing proceeds to step S102.

In step S102, the transition calculation unit 412 calculates the transition path and the transition speed of the viewpoint moving between the viewpoints before and after switching on the basis of the metadata, the band information, and the terminal position information. For example, as illustrated in FIG. 6 described above, the viewpoint transition TR31, the viewpoint transition TR32, or the like is calculated on the basis of the band information of the network 50.

In step S103, the virtual image generation unit 413 generates virtual image data on the basis of the 3D model data, the metadata, and the trajectory information. For example, as illustrated in FIG. 6 described above, according to the viewpoint transition TR31 or the viewpoint transition TR32, the virtual image VI according to the viewpoint that transitions between the viewpoints before and after switching is generated.

Note that the metadata used to generate the virtual image data is only required to include both the meta-information related to the viewpoint image after switching and the meta-information related to the viewpoint image before switching, and may include at least the meta-information related to the viewpoint image after switching.

In step S104, the switching unit 415 supplies the virtual image data generated by the virtual image generation unit 413 to the reproduction unit 416, and controls the display unit 403 to display a virtual image according to the virtual image data.

In step S105, the switching unit 415 determines whether or not switching preparation is completed. For example, it is possible to determine whether or not the switching preparation is completed by monitoring the processing status of the viewpoint image data, or the like in the viewpoint image processing unit 411.

In a case where it is determined in the determination processing of step S105 that the switching preparation is not completed, the processing returns to step S102, and the subsequent processing is repeated. That is, by repeating the processing of steps S102 to S105, the display of the virtual image is continued in the reproduction device 40.

On the other hand, in a case where it is determined in the determination processing of step S105 that the switching preparation is completed, the processing proceeds to step S106. In step S106, the switching unit 415 switches the image data supplied to the reproduction unit 416 from the virtual image data from the virtual image generation unit 413 to the viewpoint image data from the viewpoint image processing unit 411.

Thus, in the reproduction device 40, the viewpoint image according to the viewpoint image data is displayed, and the virtual image is switched to the viewpoint image after switching.

Furthermore, in a case where the band amount exceeds the predetermined value in the determination processing of step S101, since the band amount has been sufficiently secured, the processing of steps S102 to S105 is skipped, and the processing proceeds to step S106. In this case, in the reproduction device 40, the virtual image is not displayed, and the viewpoint image before switching is immediately switched to the viewpoint image after switching. At this time, the information regarding the transition of the viewpoint illustrated in FIG. 7 described above (for example, information superimposed on a map of an event venue) may be presented.

When the processing of step S106 ends, the viewpoint switching processing ends.

Next, a second example of the viewpoint switching processing corresponding to step S16 in FIG. 9 will be described with reference to the flowchart in FIG. 11. However, in the second example, the metadata is not always acquired as in the first example, but the metadata is acquired when the viewpoint switching operation is performed by the user.

Figure 10:
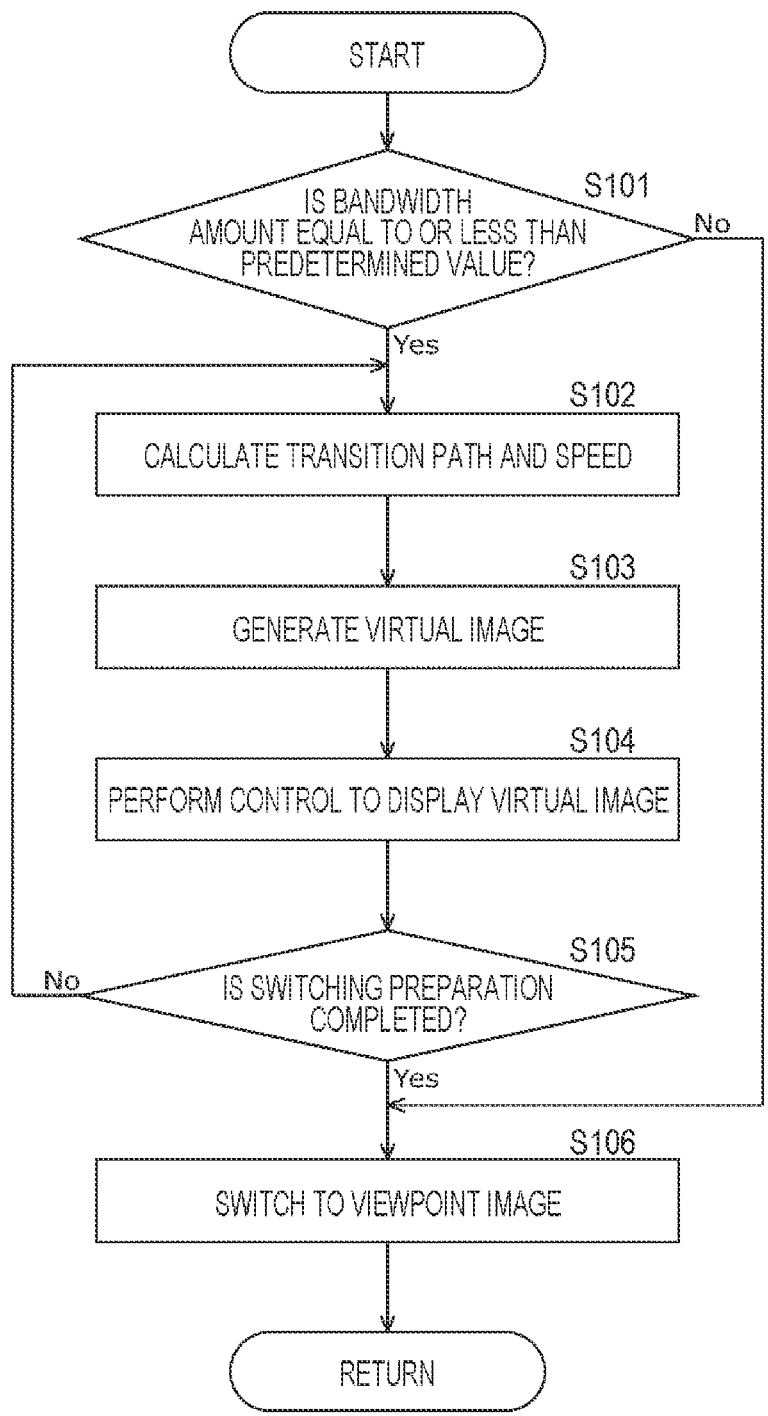
FIG. 10 is a flowchart illustrating a first example of a flow of viewpoint switching processing.

In step S201, similarly to step S101 in FIG. 10, it is determined whether or not the band amount of the network 50 is equal to or less than the predetermined value, and in a case where the band amount is equal to or less than the predetermined value ("Yes" in S201), the processing proceeds to step S202.

In step S202, the communication unit 401 receives the metadata transmitted from the distribution server 30 by requesting the metadata from the distribution server 30 via the network 50. Thus, the transition calculation unit 412 acquires the metadata from the communication unit 401.

In step S203, the transition calculation unit 412 calculates the transition path and the transition speed of the viewpoint to transition between the viewpoints before and after switching, and the metadata used at the time of calculation is the metadata acquired in the processing in step S202 immediately before.

In steps S204 to S207, similarly to steps S103 to S106 in FIG. 10, a generated virtual image is displayed until the switching preparation is completed, and when the switching preparation is completed, the virtual image is switched to the viewpoint image after switching.

The flow of the viewpoint switching processing has been described above. In the viewpoint switching processing, a virtual image based on the metadata and the 3D model data is generated according to the band information of the network 50, and the generated virtual image is controlled to be displayed before the viewpoint image after switching is displayed.

By performing such processing, since the virtual image according to the band information of the network 50 is displayed until the viewpoint image after switching becomes a displayable state after the user performs the viewpoint switching operation, it is possible to perform control to display the virtual image more accurately at a timing at which the virtual image has to be displayed.

That is, since the band of the network 50 varies depending on the environment in which the user uses the reproduction device 40, the time required for switching the viewpoint changes, but by generating the virtual image according to the band information, it is possible to perform control to display the virtual image more accurately. Thus, when the user performs the viewpoint switching operation, the viewpoint can be switched more appropriately.

Furthermore, the user can grasp the viewpoint after switching by viewing the virtual image. Moreover, the user can view the virtual image without being conscious of the time until the viewpoint switching is completed.

2. Modification

In the above description, the head mounted display has been described as an example of the reproduction device 40, but a mobile device such as a smartphone or a tablet terminal, a wearable device, or the like may be used. Note that since the reproduction device 40 includes the image processing unit 402, it may be regarded as an image processing device. Furthermore, the VR content reproduced by the reproduction device 40 is an example of content, and may be other content.

In the above description, for convenience of description, the case where the metadata server 20 is installed on the event venue side has been exemplified, but the metadata server may be installed in another place. For example, the metadata server 20 may be provided on the network 50, and the sensor data from the sensor 21 may be received by the metadata server 20 via the network 50.

Furthermore, although the physical sensor 21-1 and the distance measurement sensor 21-2 have been described as an example of the sensor 21, other sensors may be used as long as the sensors can sense spatial information and time information in the event venue. Note that, in the above description, an example has been described in which the VR content captured in the event venue such as a music concert venue is distributed, but the VR content is not limited to the event venue as long as the plurality of cameras 10 can be installed in the environment, and may be in another environment such as inside a building or in a town. Furthermore, the event venue is not limited to a music concert venue, and may be, for example, a venue where a competition such as sports is performed.

3. Configuration of Computer

The above-described series of processing (viewpoint switching processing illustrated in FIGS. 10 and 11) can be executed by hardware or software. In a case where the series of processes is executed by software, a program constituting the software is installed in a computer of each device.

Figure 12:
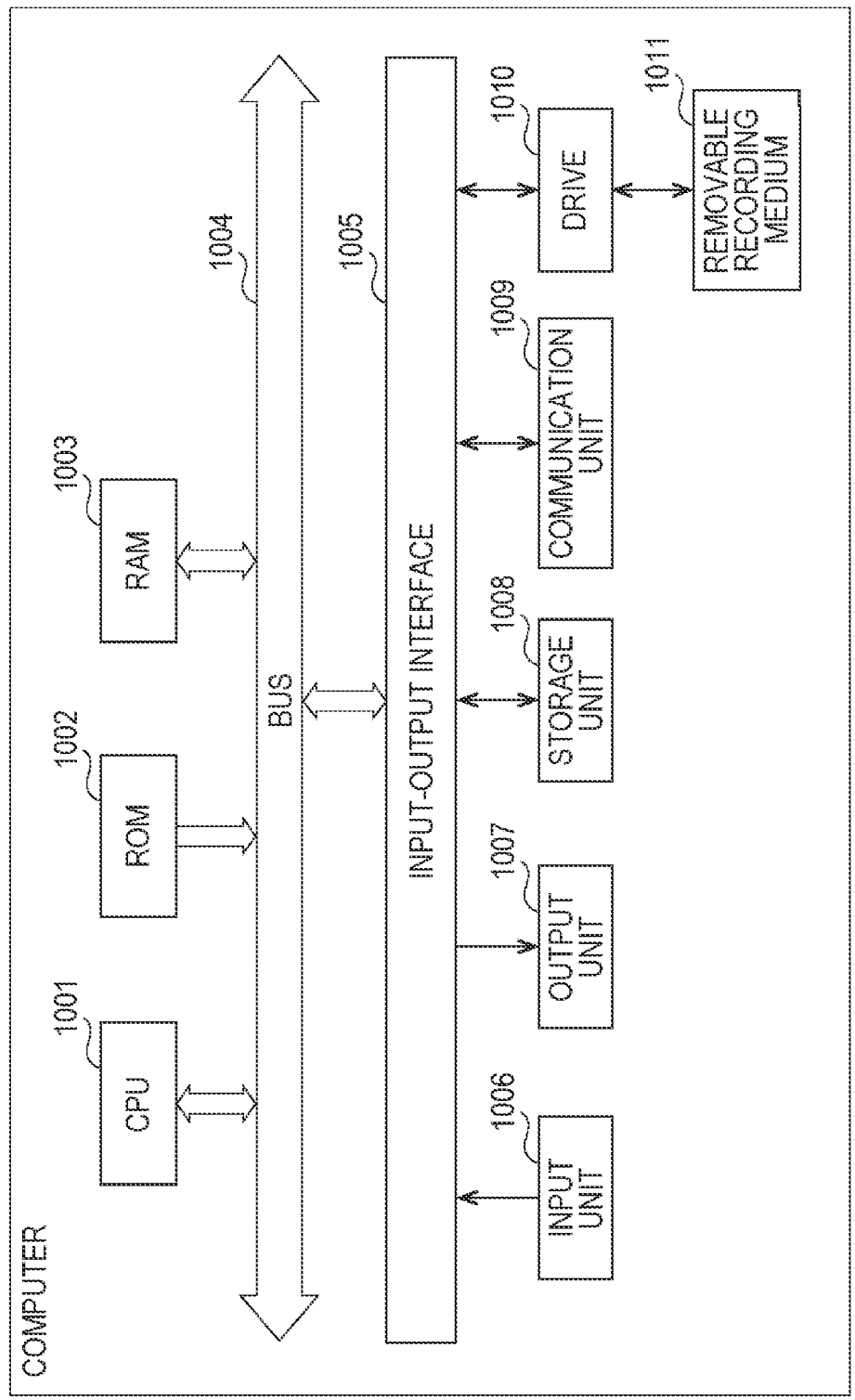
FIG. 12 is a block diagram illustrating a main configuration example of a computer.

FIG. 12 is a block diagram illustrating a configuration example of hardware of a computer that executes the above-described series of processes by a program.

In the computer, a central processing unit (CPU) 1001, a read only memory (ROM) 1002, and a random access memory (RAM) 1003 are mutually connected by a bus 1004. An input-output interface 1005 is further connected to the bus 1004. An input unit 1006, an output unit 1007, a storage unit 1008, a communication unit 1009, and a drive 1010 are connected to the input-output interface 1005.

The input unit 1006 includes a microphone, a keyboard, a mouse, and the like. The output unit 1007 includes a speaker, a display, and the like. The storage unit 1008 includes a hard disk, a nonvolatile memory, and the like. The communication unit 1009 includes a network interface and the like. The drive 1010 drives a removable recording medium 1011 such as a magnetic disk, an optical disk, a magneto-optical disk, or a semiconductor memory.

In the computer configured as described above, the CPU 1001 loads a program recorded in the ROM 1002 or the storage unit 1008 into the RAM 1003 via the input-output interface 1005 and the bus 1004 and executes the program, so as to perform the above-described series of processes.

The program executed by the computer (CPU 1001) can be provided by being recorded on, for example, a removable recording medium 1011 as a package medium or the like. Furthermore, the program can be provided via a wired or wireless transmission medium such as a local area network, the Internet, or digital satellite broadcasting.

In the computer, the program can be installed in the storage unit 1008 via the input-output interface 1005 by mounting the removable recording medium 1011 to the drive 1010. Furthermore, the program can be received by the communication unit 1009 via a wired or wireless transmission medium and installed in the storage unit 1008. In addition, the program can be installed in the ROM 1002 or the storage unit 1008 in advance.

Here, in the present description, the processing performed by the computer according to the program does not necessarily have to be performed in time series in the order described as the flowchart. That is, the processing performed by the computer according to the program also includes processing that is executed in parallel or individually (for example, parallel processing or object processing). Furthermore, the program may be processed by one computer (processor) or may be processed in a distributed manner by a plurality of computers.

Figure 11:
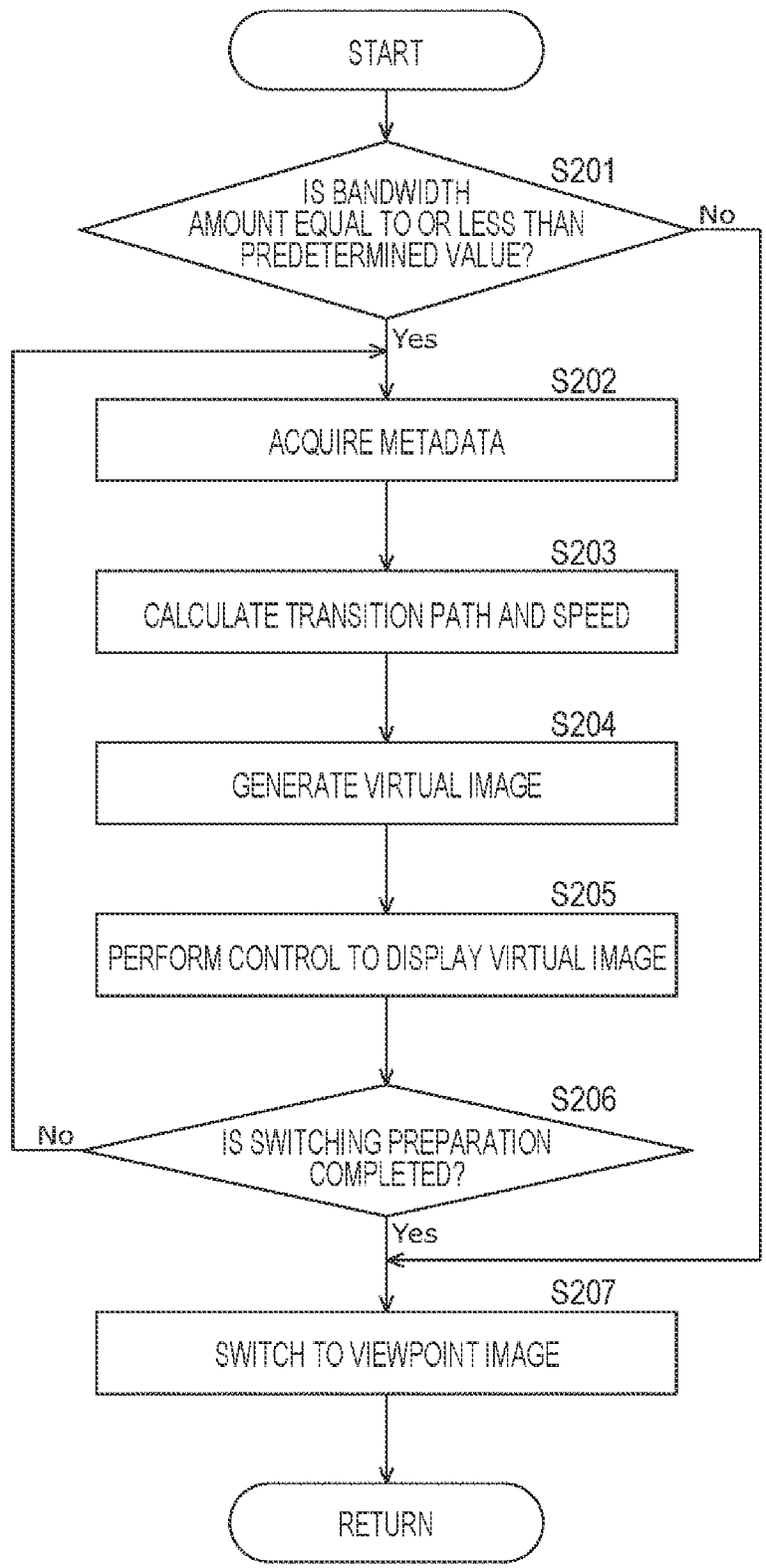
FIG. 11 is a flowchart illustrating a second example of the flow of the viewpoint switching processing.

Furthermore, each step of the viewpoint switching processing illustrated in FIGS. 10 and 11 can be executed by one device or can be shared and executed by a plurality of devices. Moreover, in a case where a plurality of processes is included in one step, the plurality of processes included in the one step can be executed in a shared manner by a plurality of devices in addition to being executed by one device.

Moreover, in the present description, a system means a set of a plurality of components (devices, modules (parts), and the like), and it does not matter whether or not all components are in the same housing. Therefore, both of a plurality of devices housed in separate housings and connected via a network and a single device in which a plurality of modules is housed in one housing are systems.

Note that the embodiments of the present technology are not limited to the above-described embodiments, and various modifications are possible without departing from the gist of the present technology.

Furthermore, the effects described in the present description are merely examples and are not limited, and other effects may be provided.

Note that the present technology can also employ the following configurations.

(1)

An image processing device, including:
a virtual image generation unit that generates a virtual image based on viewpoint image-related information related to a first viewpoint image and model data corresponding to a subject of the viewpoint image according to band information regarding transmission of the viewpoint image; and
a display control unit that performs control to display the generated virtual image before displaying the first viewpoint image.

(2)

The image processing device according to (1), in which
the viewpoint image-related information includes information regarding a viewpoint position of the viewpoint image and information regarding a subject in the viewpoint image.

(3)

The image processing device according to (1) or (2), in which
the virtual image generation unit generates the virtual image in a case where a band amount indicated by the band information is equal to or less than a predetermined value.

(4)

The image processing device according to (3), in which
the predetermined value is a predetermined fixed value or a variable value according to a processing capability of a device that displays the virtual image.

(5)

The image processing device according to any one of (1) to (4), in which
the virtual image generation unit generates the virtual image on the basis of viewpoint image-related information related to a second viewpoint image displayed before switching to the first viewpoint image.

(6)

The image processing device according to (5), in which
the virtual image generation unit generates the virtual image according to trajectory information defined by the first viewpoint position and the second viewpoint position on the basis of first viewpoint position information regarding a first viewpoint position according to the first viewpoint image and second viewpoint position information regarding a second viewpoint position according to the second viewpoint image.

(7)
The image processing device according to (6), in which the virtual image generation unit determines the trajectory information on the basis of the band information.

(8)
The image processing device according to (7), in which a band amount indicated by the band information and a length of a trajectory distance indicated by the trajectory information have a negative correlation.

(9)
The image processing device according to (7) or (8), in which
the display control unit adjusts a speed at which a viewpoint position according to the virtual image moves on a trajectory indicated by the trajectory information on the basis of the band information.

(10)
The image processing device according to (6), in which
in a case where the band amount indicated by the band information exceeds a predetermined value, the display control unit hides the virtual image and displays a map according to the first viewpoint position information and the second viewpoint position information.

(11)
The image processing device according to any one of (1) to (10), in which
the display control unit switches from the virtual image to the first viewpoint image in a case where preparation for display of the first viewpoint image is completed.

(12)
The image processing device according to any one of (1) to (11), in which
the viewpoint image-related information includes generation information of the subject, and the model data is an image related to a specific character associated with the subject.

(13)
The image processing device according to (12), in which
the virtual image generation unit generates a two-dimensional or three-dimensional virtual image according to a processing capability of a device that displays the virtual image.

(14)
The image processing device according to any one of (1) to (13), in which
the viewpoint image-related information is acquired at a predetermined interval or in response to a viewpoint switching instruction by a user.

(15)
The image processing device according to (14), in which
an acquisition timing is different for each piece of information included in the viewpoint image-related information.

(16)
The image processing device according to (2), in which
the information regarding a viewpoint position of the viewpoint image includes information regarding a position, a posture, and an angle of view of a camera that captures the viewpoint image, and
the information regarding the subject in the viewpoint image includes information regarding a position and a posture corresponding to the subject.

(17)
The image processing device according to (16), in which
the viewpoint image-related information further includes information regarding a space in which the subject exists and information regarding an object existing in the space.

(18)
The image processing device according to any one of (1) to (17), in which the viewpoint image-related information is transmitted in a band securing higher reliability than the viewpoint image.

(19)
An image processing method including, by an image processing device:
generating a virtual image based on viewpoint image-related information related to a first viewpoint image and model data corresponding to a subject of the viewpoint image according to band information regarding transmission of the viewpoint image; and
performing control to display the generated virtual image before displaying the first viewpoint image.

(20)
A program for causing a computer to function as:
a virtual image generation unit that generates a virtual image based on viewpoint image-related information related to a first viewpoint image and model data corresponding to a subject of the viewpoint image according to band information regarding transmission of the viewpoint image; and
a display control unit that performs control to display the generated virtual image before displaying the first viewpoint image.

(21)
An image processing device including a generation unit that generates viewpoint image-related information related to a first viewpoint image on the basis of a camera that captures a viewpoint image and sensor data according to a detection result related to a subject in the viewpoint image, in which the first viewpoint image is displayed after displaying a virtual image based on the viewpoint image-related information and model data corresponding to the subject of the viewpoint image according to band information regarding transmission of the viewpoint image.

(22)
The image processing device according to (21), in which
the viewpoint image-related information includes information regarding a viewpoint position of the viewpoint image and information regarding a subject in the viewpoint image.

(23)
The image processing device according to (22), in which
the information regarding a viewpoint position of the viewpoint image includes information regarding a position, a posture, and an angle of view of a camera that captures the viewpoint image, and
the information regarding the subject in the viewpoint image includes information regarding a position and a posture corresponding to the subject.

REFERENCE SIGNS LIST

1 Content distribution system
10, 10-1 to 10-N Camera
Metadata server
30 21 Sensor
21-1 Physical sensor
21-2 Distance measurement sensor Distribution server
Reproduction device
50, 50-1, 50-2 Network
100 Camera system
101 3D model generation unit
102 Communication unit
201 Analysis unit
202 Metadata generation unit
203 Communication unit
401 Communication unit
402 Image processing unit
403 Display unit
404 Input unit
405 Detection unit
410 Display control unit
411 Viewpoint image processing unit
412 Transition calculation unit
413 Virtual image generation unit
414 Storage unit
416 Reproduction unit
1001 CPU

The invention claimed is:

1. An image processing device, comprising:
a virtual image generation unit that generates a virtual image based on viewpoint image-related information related to a first viewpoint image and model data corresponding to a subject of the viewpoint image according to band information regarding transmission of the viewpoint image; and
a display control unit that performs control to display the generated virtual image before displaying the first viewpoint image,
wherein the virtual image generation unit and the display control unit are each implemented via at least one processor.

2. The image processing device according to claim 1, wherein
the viewpoint image-related information includes information regarding a viewpoint position of the viewpoint image and information regarding a subject in the viewpoint image.

3. The image processing device according to claim 2, wherein
the information regarding a viewpoint position of the viewpoint image includes information regarding a position, a posture, and an angle of view of a camera that captures the viewpoint image, and
the information regarding the subject in the viewpoint image includes information regarding a position and a posture corresponding to the subject.

4. The image processing device according to claim 3, wherein
the viewpoint image-related information further includes information regarding a space in which the subject exists and information regarding an object existing in the space.

5. The image processing device according to claim 1, wherein
the virtual image generation unit generates the virtual image in a case where a band amount indicated by the band information is equal to or less than a predetermined value.

6. The image processing device according to claim 5, wherein
the predetermined value is a predetermined fixed value or a variable value according to a processing capability of a device that displays the virtual image.

7. The image processing device according to claim 1, wherein
the virtual image generation unit generates the virtual image on a basis of viewpoint image-related information related to a second viewpoint image displayed before switching to the first viewpoint image.

8. The image processing device according to claim 7, wherein
the virtual image generation unit generates the virtual image according to trajectory information defined by the first viewpoint position and the second viewpoint position on a basis of first viewpoint position information regarding a first viewpoint position according to the first viewpoint image and second viewpoint position information regarding a second viewpoint position according to the second viewpoint image.

9. The image processing device according to claim 8, wherein
the virtual image generation unit determines the trajectory information on a basis of the band information.

10. The image processing device according to claim 9, wherein
a band amount indicated by the band information and a length of a trajectory distance indicated by the trajectory information have a negative correlation.

11. The image processing device according to claim 9, wherein
the display control unit adjusts a speed at which a viewpoint position according to the virtual image moves on a trajectory indicated by the trajectory information on a basis of the band information.

12. The image processing device according to claim 8, wherein
in a case where the band amount indicated by the band information exceeds a predetermined value, the display control unit hides the virtual image and displays a map according to the first viewpoint position information and the second viewpoint position information.

13. The image processing device according to claim 1, wherein
the display control unit switches from the virtual image to the first viewpoint image in a case where preparation for display of the first viewpoint image is completed.

14. The image processing device according to claim 1, wherein
the viewpoint image-related information includes generation information of the subject, and
the model data is an image related to a specific character associated with the subject.

15. The image processing device according to claim 14, wherein
the virtual image generation unit generates a two-dimensional or three-dimensional virtual image according to a processing capability of a device that displays the virtual image.

16. The image processing device according to claim 1, wherein
the viewpoint image-related information is acquired at a predetermined interval or in response to a viewpoint switching instruction by a user.

17. The image processing device according to claim 16, wherein
an acquisition timing is different for each piece of information included in the viewpoint image-related information.

18. The image processing device according to claim 16, wherein the viewpoint image-related information is transmitted in a band securing higher reliability than the viewpoint image.

19. An image processing method comprising, by an image processing device:
generating a virtual image based on viewpoint image-related information related to a first viewpoint image and model data corresponding to a subject of the viewpoint image according to band information regarding transmission of the viewpoint image; and
performing control to display the generated virtual image before displaying the first viewpoint image.

20. A non-transitory computer-readable medium having embodied thereon a program, which when executed by a computer causes the computer to execute a method, the method comprising:
generating a virtual image based on viewpoint image-related information related to a first viewpoint image and model data corresponding to a subject of the viewpoint image according to band information regarding transmission of the viewpoint image; and
performing control to display the generated virtual image before displaying the first viewpoint image.

\* \* \* \* \*